Feb. 24, 1970   W. CLARK   3,497,056
MAGNETIC CONVEYOR DRIVE UNIT
Filed Jan. 2, 1968
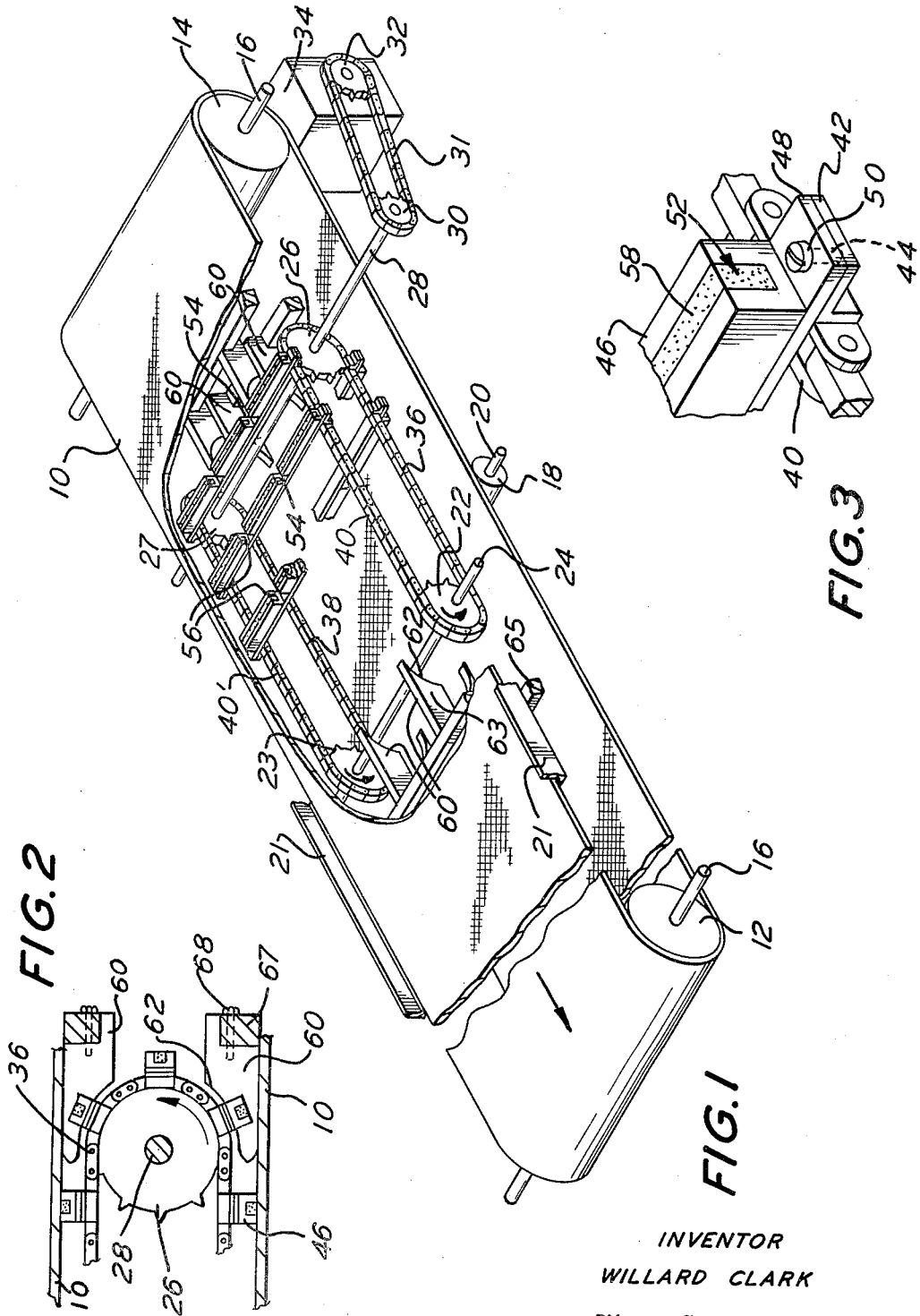
INVENTOR
WILLARD CLARK
BY Seethel & Gouda
ATTORNEYS.

United States Patent Office 3,497,056
Patented Feb. 24, 1970

3,497,056
MAGNETIC CONVEYOR DRIVE UNIT
Willard Clark, Farmland, Ind., assignor to Maul Bros. Inc., Millville, N.J., a corporation of New Jersey
Filed Jan. 2, 1968, Ser. No. 695,235
Int. Cl. B65g 23/18
U.S. Cl. 198—203   7 Claims

ABSTRACT OF THE DISCLOSURE

A conveyor drive unit which provides positive, non-slip drive for a woven wire conveyor belt by means of a plurality of permanent magnets affixed to the drive unit. The magnets drive the wire conveyor belt regardless of the tension on the belt, the physical condition of the belt, or the amount of contaminants which may be on the belt. The drive unit includes a driven endless band of permanent magnets which travel parallel with and closely adjacent to the conveyor belt. The wire conveyor belt is attached to the top and bottom of the drive unit so as to have a push-pull drive. Stripping means such as fingers are provided for stripping the conveyor belt from the magnets.

---

The present invention relates to a conveyor drive unit and more particularly to a conveyor drive unit which provides a positive, non-slip drive for a woven wire conveyor belt regardless of the tension on the belt, the physical condition of the belt, or the amount of contaminants on the belt.

It is an object of the present invention to provide a conveyor drive unit which will provide positive non-slip drive for a woven wire conveyor belt.

It is another object of the present invention to provide a conveyor drive unit which includes an endless band of permanent magnets which travel in a path parallel to and between the runs of the conveyor belt wherein the magnets grip and drive the conveyor belt on the two inner surfaces of the belt thus providing a push-pull drive on the belt.

It is a further object of the present invention to provide a conveyor drive unit which includesa stripping means for stripping the conveyor belt from the magnets of the drive unit by means of fingers which guide the conveyor belt onto and off of the magnets with a minimum amount of vibration.

It is a still further object of the present invention to provide a conveyor drive unit which operates regardless of the amount of tension on the belt, the physical condition of the belt, or the amount of contaminants which may be on the belt.

It is yet another object of the present invention to provide a conveyor drive unit which is relatively inexpensive to manufacture and utilize and highly effective in use.

Other objects will appear hereinafter.

The above and other objects are accomplished by means of the present invention. It is conventional to use woven wire mesh conveyor belts with glass making machinery. Formed glassware is deposited onto a woven wire conveyor belt and eventually conveyed to an annealing lehr. The conveyor may be utilized in conjunction with an Individual Section machine (hereinafter IS machine) such as the type shown in U.S. Patent 1,911,119.

The woven wire conveyor belt is suitably mounted for movement about an endless path and will deposit glassware onto a further conveyor or into an annealing lehr. The magnetic conveyor drive unit is mounted between the runs of the endless conveyor belt. The magnetic conveyor drive unit includes two positively driven chains spaced from one another. The magnets are secured to selective links on the chains at spaced points therealong.

The magnets are horseshoe or U-shaped magnets and have notches in the upstanding portions of the shoe to facilitate stripping of the magnets from the wire mesh conveyor belt. Epoxy or other non-magnetic material is placed between the upstanding portions of the U-shaped magnets to prevent contaminants from entering such opening and thereby bridge the poles of the magnets. No epoxy is inserted in the notches so that the notches provide a clear channel in which the stripping fingers may operate.

For the purpose of illustrating the invention, there is shown in the drawings a form which is presently preferred; it being understood, however, that this invention is not limited to the precise arrangements and instrumentalities shown.

FIGURE 1 is a perspective view of the conveyor drive unit of the present invention;

FIGURE 2 is a side elevation view of the stripping means of the present invention; and FIGURE 3 is a perspective view of the interconnecting means for the magnets utilized in the present invention.

Referring now to the drawings in detail wherein like numerals indicate like structure throughout the several views, there is shown in FIGURE 1 a wire mesh conveyor belt generally indicated by the reference numeral 10. The conveyor belt is adapted to be moved in an elliptical path about freely rotatable rollers 12 and 14.

The belt 10 is an endless belt which may be first pre-assembled and then mounted over the rollers 12 and 14. The rollers 12 and 14 the supported on shafts 16 which may be suitably journaled in side frames (not shown).

Since the wire mesh belt is quite heavy, at least idler support roller 18 is provided midway between the rollers 12 and 14 to support the outer surface of the underside of the belt. The idler roller 18 is mounted on a shaft 20 which is suitably journaled in the side frame of the drive unit. Spaced angle irons 21 may be provided for supporting the top run of the conveyor belt at its outer edges.

Spaced sprockets 22 and 23 are mounted on a shaft 24. Similarly, spaced sprockets 26 and 27 are mounted on a shaft 28. Sprocket 22 is aligned with and in the same vertical plane as sprocket 26. The vertical plane is perpendicular to the horizontal plane which contains the shafts 24 and 28. Sprocket 23 and sprocket 27 are aligned and in a vertical plane. The sprockets are fixedly connected to their respective shafts. The sprockets 22, 23, 26 and 27 are identical.

A gear 30 is fixedly secured to the shaft 28. Gear 30 is adapted to be rotated by a gear 32 which is driven by the gear box 34. The gears 30 and 32 may be interconnected by a chain 31 or by means of a conventional gear train. The gear box 34 may be a conventional gear box utilized in an IS machine. The drive may also be any suitable conventional motor or the like.

An endless belt chain 36 is supported for movement in an elliptical path by sprockets 22 and 26. Similarly, a chain 38 spaced from the chain 36 is supported for movement in an elliptical path by the sprockets 23 and 27. The chains may hereinafter be referred to as an endless carrier.

Each of the chains has a plurality of links 40 thereon. Each of the links 40 may be provided with a flat extension 42 which is substantially perpendicular to the main body portion of the link. The flat extension 42 is provided with a hole 44 therein for a purpose which will be explained in detail hereinafter. The chain 38 is identical with the chain 36 and hence it will only be necessary to discuss the chain 36 in detail. Identical structure on chain 38 will be indicated with a primed notation of the same reference numeral.

A plurality of permanent magnets 46 is secured to the chains 36 and 38. For convenience, only a few of the magnets 46 have been shown in the drawing. The magnets 46 may be slightly shorter than the width of the conveyor belt 10. As shown in detail in FIGURE 3, each of the permanent magnets 46 has a flat extension 48 thereon. Each extension 48 is provided with a hole 50 therein. The holes 50 are adapted to be aligned with the holes 44 so that the magnets may be secured to the links 40 of the chains.

The magnets 46 may be secured to the links 40 and 40' of the chains 36 and 38, respectively by any suitable fastening means such as bolts or the like.

Each of the magnets 46 is horseshoe or U-shaped. The upstanding legs of the magnet define a space 52 therebetween. The space 52 separates the poles of the magnet. Each magnet is provided with notches 54 and 56 therein. When the magnets 46 are aligned on the chains 36 and 38, the channels 54 and 56 in each of the magnets 46 are aligned. In order to prevent contaminants from entering the space 52 between the legs of the magnet member and hence weakening the magnet, epoxy 58 is inserted into the space 52. Other suitable non-magnetic material which will not affect the polarity of the magnets may be inserted into the space 52.

Four pairs of fingers 60 are provided and are supported by the side frame of the unit. Two pairs of fingers 60 are provided for stripping the conveyor belt 10 from the magnets 46. The fingers 60 may be fixedly mounted on a stationary shaft 65 or may be fixedly secured to a bar member 67 by means of bolts 68 or the like.

The pair of fingers 60 shown in FIGURE 1 is used to strip the top run of the belt 10 from the magnets 46. The stripping fingers 60 shown in FIGURE 3 strip the bottom run of the belt 10 from the magnets 46. Two further pairs of fingers 60 are provided for guiding the conveyor belt onto the magnets 46 with a minimum amount of vibration. The fingers 60 are provided with camming surfaces 62 and flat upper surfaces 63. The fingers 60 are adapted to be received within the channels 54 and 56 of the permanent magnet members 46.

The camming surfaces 62 provide gradual separation of the magnets from the wire mesh conveyor belt. Similarly, the camming surfaces 62 provide for gradual adherence of the belt to the magnets 46. Accordingly, vibration of the belt is minimized and smooth operation is obtained. The magnets may be spaced approximately ½ to 4 inches apart on the chain. Hence, as magnets are separated from the belt on one inner surface, at the opposite inner surface of the belt magnets are gripping and pulling the belt. This feature further enhances the smooth operation of the conveyor drive unit.

The operation of the conveyor drive unit is readily apparent from the above discussion. It is merely necessary to drive the shaft 28 by means of the drive unit 34. Rotation of the shaft 28 causes rotation of the shaft 24 through the chains 36 and 38. Hence, the sprockets 22 and 23 secured thereto are also rotated. Rotation of the shaft 28 causes rotation of the sprockets 26 and 27 secured thereto. As the sprockets 22, 23, 26 and 27 are rotated, the chains 36 and 38 are driven about an elliptical path. Hence, the magnets 46, carried by the chains 36 and 38 are also moved through an elliptical path. The outer surfaces of the sprockets 22, 23, 26 and 27 are closely adjacent the mesh conveyor belt. Accordingly, the magnets 46 grip the conveyor belt on the upper and lower paths of movement of the magnets. There is little or no corrugating or warping of the mesh conveyor belt as it adheres to the various magnets 46.

The magnets 46 provide a positive drive regardless of the tension on the belt, physical condition of the belt, or amount of contaminants which may be on the belt.

The present invention may be embodied in other specific forms without departing from the spirit or essential attributes thereof.

It is claimed:
1. Conveyor means comprising an endless belt, drive means coupled to said endless belt, said drive means including an endless carrier, said endless carrier having a plurality of permanent magnets mounted thereto, mating means for mechanically gradually placing said permanent magnets in magnetic coupling relationship with said endless belt, and stripper means for mechanically removing said permanent magnets from contact with said endless belt.

2. Conveyor means as set forth in claim 1 wherein said carrier includes a pair of endless chains.

3. Conveyor means as set forth in claim 1 wherein stripper means includes fingers at one end of said carrier means, said magnets having openings for receiving said fingers.

4. Conveyor means as set forth in claim 1 including the drive of an individual section glass machine drivingly coupled to said carrier.

5. Conveyor means as set forth in claim 1 wherein said magnets are U-shaped and have a pair of upstanding legs defining said U, the space defined by said U being filled with a non-magnetic solid material.

6. Conveyor means as set forth in claim 1 wherein said magnets have notches therein, said stripper means cooperating with said notches to strip said belt from said carrier.

7. Conveyor means as set forth in claim 1 wherein said endless belt is a wire mesh belt.

References Cited

UNITED STATES PATENTS

| | | | |
|---|---|---|---|
| 2,594,342 | 4/1952 | Pettyjohn | 198—203 XR |
| 2,873,843 | 2/1959 | Wilson | 198—203 XR |
| 3,164,081 | 1/1965 | Vincze | 198—41 XR |

ROBERT G. SHERIDAN, Primary Examiner

U.S. Cl. X.R.

198—41